United States Patent [19]

Green

[11] Patent Number: 5,142,454
[45] Date of Patent: Aug. 25, 1992

[54] VEHICLE LAMP ASSEMBLY

[75] Inventor: Paul D. Green, Dearborn, Mich.

[73] Assignee: Ford Motor Company, Dearborn, Mich.

[21] Appl. No.: 793,895

[22] Filed: Nov. 18, 1991

[51] Int. Cl.⁵ .............................................. B60Q 1/00
[52] U.S. Cl. ...................................... 362/61; 362/226; 362/80
[58] Field of Search ..................... 362/61, 226, 369, 80

[56] References Cited

U.S. PATENT DOCUMENTS 4,344,116  8/1982  Martin ................................. 362/226
4,635,174  1/1987  Montet ................................. 362/61

Primary Examiner—Carroll B. Dority
Attorney, Agent, or Firm—Charles H. Ellerbrock; Clifford L. Sadler

[57] ABSTRACT

A vehicle lamp assembly comprises a housing adapted to be affixed to a vehicle, a lamp component adapted to be mounted in the housing, and means for rigidly retaining the lamp component in the housing without the use of conventional threaded fasteners. The securing means comprises a resilient tab extending away from the lamp component which engages a retainer affixed to the housing, to rigidly maintain the lamp component in the housing.

11 Claims, 2 Drawing Sheets

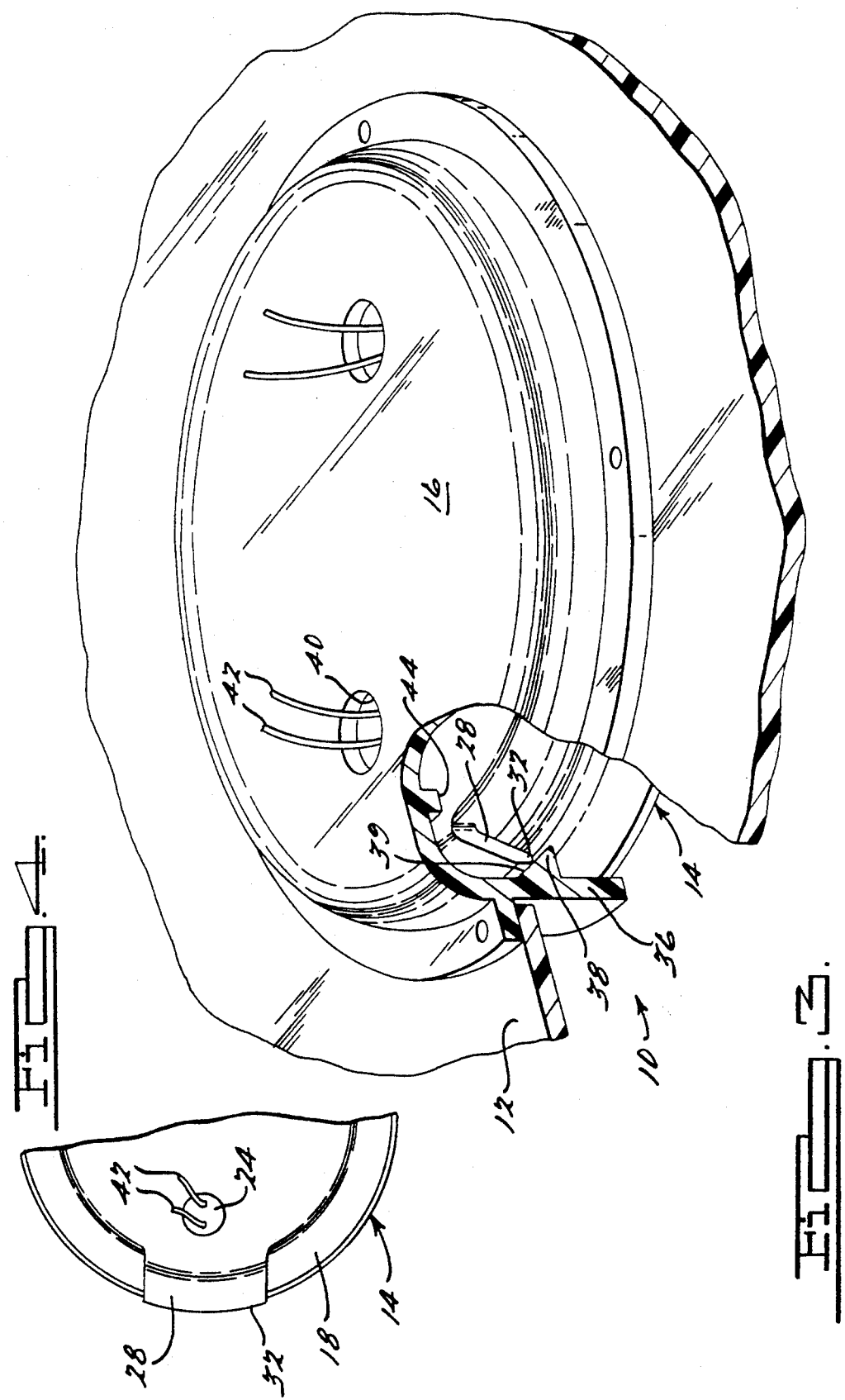

VEHICLE LAMP ASSEMBLY

FIELD OF THE INVENTION

This invention relates generally to a vehicle lamp assembly. More particularly, the invention is directed to a vehicle lamp assembly comprising a housing adapted to be affixed to a vehicle, a lamp component adapted to be mounted in the housing, and means for rigidly retaining the lamp component in the housing.

BACKGROUND OF THE INVENTION

It is well known to affix automotive lamp assemblies at various locations throughout the body of a vehicle, to provide interior or exterior illumination, for electronically indicating various vehicle operating parameters or providing warnings of equipment malfunctions, to serve as conventional brake lights or as high mounted stop lamps as is required in modern motor vehicles, etc.

Generally, vehicle lamp assemblies comprise a housing affixed to the vehicle body and one or more lamp components mounted in the housing and retained therein by means of threaded fasteners. Oftentimes, these conventional threaded fasteners become loose due to the vibration caused by routine operation of the vehicle. Thereafter, the lamp component is no longer rigidly retained in the housing, and begins to squeak or rattle during operation of the motor vehicle.

Furthermore, the cost and time associated with mounting lamp components into housings and securing same utilizing threaded fasteners increases the manufacturing cost of the motor vehicle.

It would be desirable to produce a vehicle lamp assembly, including a housing adapted to be affixed to the body of the vehicle, a lamp component adapted to be mounted in the housing, and means for rigidly retaining the lamp component in the housing without the use of threaded fasteners.

SUMMARY OF THE INVENTION

Accordant with the present invention, a vehicle lamp assembly, wherein a lamp component is rigidly retained within a housing affixed to the body of the vehicle without utilizing threaded fasteners, has surprisingly been discovered. The vehicle lamp assembly comprises:
A) a housing adapted to be affixed to the vehicle;
B) a lamp component adapted to be mounted in the housing; and
C) means for rigidly securing the lamp component in the housing, comprising:
  i) a tab extending outwardly from the lamp component, including a distal portion; and
  ii) a retainer extending inwardly from a wall of the housing, including a ramp surface, the distal portion of the tab engaging the ramp surface and thereby deflecting the tab inwardly toward the lamp component while simultaneously urging the lamp component against the housing.

The vehicle lamp assemblies of the present invention are particularly useful for providing interior illumination and for use as high mounted stop lamps in motor vehicles.

BRIEF DESCRIPTION OF THE DRAWINGS

The novel features which are characteristic of the present invention are set forth with particularity in the appended claims. The invention itself, however, both as to structure and method of manufacture will best be understood from the accompanying description of specific embodiments, when read in connection with the drawings, in which:

FIG. 3 is a fragmentary, perspective view, partially broken away, of an embodiment of a vehicle lamp assembly according to the present invention; and FIG. 4 is a fragmentary plan view of the rear of the lamp component of the vehicle lamp assembly of FIG. 3.

DETAILED DESCRIPTION OF THE PREFERRED EMBODIMENT

Figure 1:
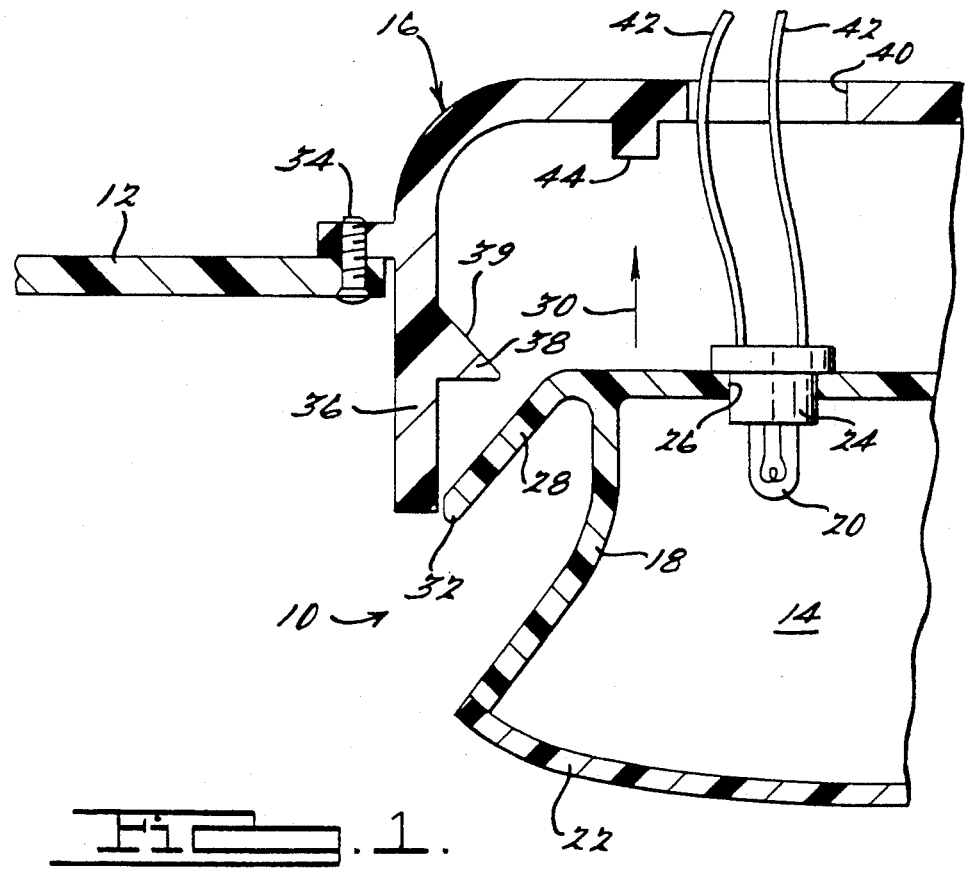
FIG. 1 is a fragmentary, cross-sectional view of a lamp component housing affixed to the body of a motor vehicle, and a lamp component, prior to the lamp component being mounted into the housing, embodying the features of the present invention.

Referring now to the drawings, there is shown generally a vehicle lamp assembly 10 affixed to a body panel or some other surface structure of a motor vehicle 12. The vehicle lamp assembly 10 includes a lamp component 14, a housing 16, and means for securely mounting the lamp component 14 into the housing 16, as more fully set forth hereinafter.

In a preferred embodiment of the present invention, the lamp component 14 includes a generally concave reflector 18, a lamp 20 positioned within the reflector 18, and a translucent lens 22 attached to the reflector 18 and cooperating therewith to enclose and protect the lamp 20. Alternatively, the lamp component 14 may include the reflector 18 and lamp 20, without a lens 22. Lens 22 materials are well-known in the art and may be selected from clear or colored glass or plastics such as polymethyl methacrylate, acrylics, polycarbonates, styrenics, etc. The reflector 18 may be fabricated from metal or a metal-coated plastic such as, for example, aluminized acrylonitrile-butadiene-styrene copolymer. The lens 22 may permanently or releasably be attached to the reflector 18 by conventional means such as, for example, solvent or thermal welding, frictional engagement, snap fitting, etc. The lamp 20 may be any conventional device useful for producing illumination utilizing electrical energy. In a preferred embodiment of the present invention, the lamp 20 is mounted in a socket 24, which in turn is releasably mounted in an aperture 26 in the reflector 18 utilizing, for example, a press fit or bayonet mount.

The lamp component 14 includes a flexible tab 28 which extends outwardly, away from the lamp component 14 at an angle obtuse to the direction of installation of the lamp component 14 into the housing 16 (designated in FIG. 1 by the arrow 30). The tab 28 includes a distal portion 32, which generally may be of any surface configuration (a rounded configuration is illustrated in the Figures). The tab 28 conveniently may be formed as an integral part of the lamp component 14 as illustrated in the Figures, or may be attached by conventional means such as, for example, solvent or thermal welding.

Figure 2:
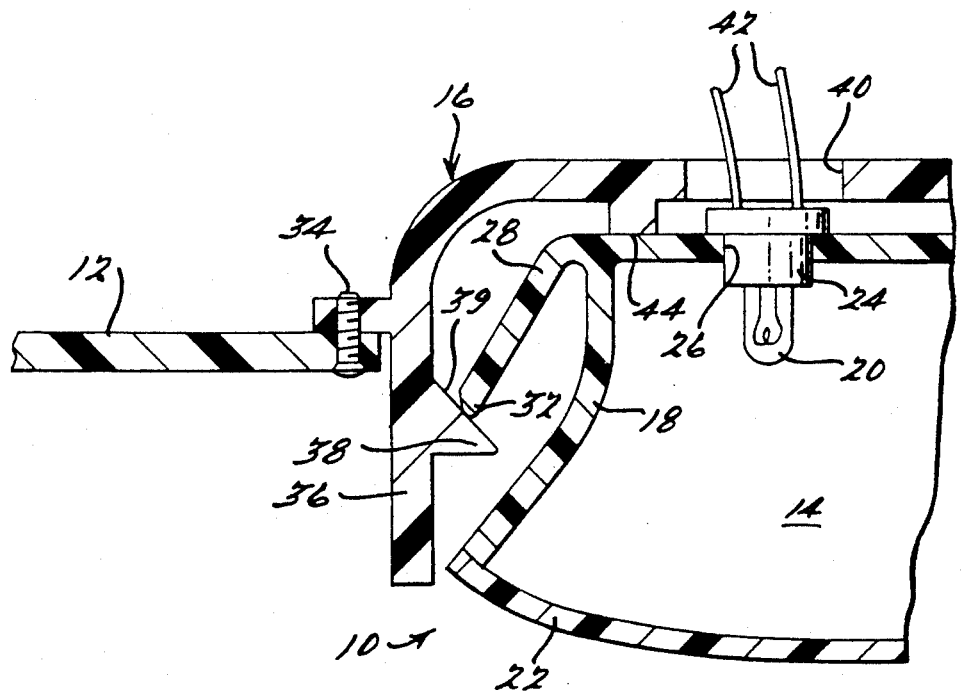
FIG. 2 is a fragmentary, cross-sectional view of the housing and lamp component of FIG. 1, illustrating the lamp component securely mounted into the housing.

The housing 16 is adapted to be affixed to the vehicle by conventional methods. FIGS. 1 and 2 illustrate the housing 16 affixed to the vehicle body panel 12 by means of threaded fasteners 34. The housing 16 is also adapted to receive the lamp component 14, and securely retain same therein. The housing 16 includes a wall 36 which substantially surrounds and protects a portion of the lamp component 14 when the lamp component 14 is mounted into the housing 16.

A retainer 38 extends inwardly from the wall 36 toward the center of the housing 16. The retainer 38 includes a ramp surface 39 which extends from the wall 36 inwardly toward the center of the housing at an angle obtuse to the direction of installation of the lamp component 14 into the housing 16 (designated in FIG. 1 by the arrow 30). The ramp surface 39 is adapted to engage the distal portion 32 of the tab 28 when the lamp component 14 is securely mounted within the housing 16. The housing 16 conveniently may include an aperture 40 through which electrical leads 42 to the lamp 20 may pass, and through which the lamp 20 and associated socket 24 may be removed for maintenance after the lamp component 14 has been securely mounted into the housing 16. The housing 16 may be constructed from materials generally known as useful for manufacturing electrical housings such as, for example, metals or plastics, and may be formed by conventional processes such as stamping or injection molding.

In operation, the lamp component 14 is positioned adjacent the housing 16, as illustrated in FIG. 1. The lamp component 14 is then inserted into the housing 16 by moving the lamp component 14 generally in the direction indicated by the arrow 30. During this operation, the tab 28 is deflected by sliding contact with the retainer 38, and resiliently bent inwardly toward the lamp component 14. Eventually, as the lamp component 14 is inserted further into the housing 16, the lamp component 14 engages the housing 16 at a contact surface 44, and simultaneously the distal portion 32 of the tab 28 springs outwardly to engage the ramp surface 39, finally coming to rest on the ramp surface 39 as illustrated in FIG. 2. At this time, the lamp component 14 is securely mounted into the housing 16.

As will be apparent to those ordinarily skilled in the art, the lamp component 14 is rigidly retained in the housing 16 due to the resilient outwardly directed force of the deflected tab 28 urging the distal portion 32 thereof against the ramp surface 39. The ramp surface 39 maintains the deflection of the tab 28 inwardly toward the lamp component 14, and simultaneously urges the lamp component 14 against the housing 16 at the contact surface 44.

The recited means for securing the lamp component 14 into the housing 16 provides for quick assembly of the vehicle lamp assembly 10 without the need for threaded fasteners. Generally, a plurality of the securing means is used in a typical vehicle lamp assembly, although only one is illustrated in the Figures. Moreover, the securing means will not loosen to cause the lamp assembly 14 to squeak or rattle within the housing 16. Rather, vibrations caused by operation of the vehicle will tighten the securing means, by causing the distal portion 32 of the resilient tab 28 to move in a direction outwardly from the lamp assembly 14 along the ramp surface 39, thereby urging the lamp assembly 14 against the housing 16 with an even greater force.

From the foregoing description, one skilled in the art can easily ascertain the essential characteristics of the present invention, and without departing from the spirit and scope thereof, can make changes and modifications in the invention to adapt it to various usages and conditions. For example, the ramp surface 39 may be curved rather than planar.

What is claimed is:

1. A vehicle lamp assembly, comprising:
   A) a housing adapted to be affixed to the vehicle,
   B) a lamp component adapted to be mounted in the housing; and
   C) means for rigidly securing the lamp component in the housing, comprising:
      i) a tab extending outwardly from the lamp component, including a distal portion; and
      ii) a retainer extending inwardly from a wall of the housing, including a ramp surface,
   the distal portion of the tab engaging the ramp surface and thereby deflecting the tab inwardly toward the lamp component while simultaneously urging the lamp component against the housing.

2. The vehicle lamp assembly according to claim 1, wherein the lamp component comprises a generally concave reflector, a lamp positioned within the reflector, and a translucent lens attached to the reflector cooperating therewith to enclose and protect the lamp.

3. The vehicle lamp assembly according to claim 1, wherein the tab extends away from the lamp component at an angle obtuse to the direction of installation of the lamp component into the housing.

4. The vehicle lamp assembly according to claim 1, wherein the ramp surface extends inwardly toward the center of the housing at an angle obtuse to the direction of installation of the lamp component into the housing.

5. The vehicle lamp assembly according to claim 1, wherein the ramp surface is curved.

6. The vehicle lamp assembly according to claim 1, wherein the housing includes an aperture for removing a lamp from the lamp component.

7. A vehicle lamp assembly, comprising:
   A) a housing adapted to be affixed to the vehicle;
   B) a lamp component adapted to be mounted in the housing; and
   C) means for rigidly securing the lamp component in the housing, comprising:
      i) a tab extending outwardly away from the lamp component at an angle obtuse to the direction of installation of the lamp component into the housing, the tab including a distal portion;
      ii) a retainer extending inwardly from a wall of the housing, including a ramp surface extending inwardly toward the center of the housing at an angle obtuse to the direction of installation of the lamp component into the housing,
   the distal portion of the tab engaging the ramp surface and thereby deflecting the tab inwardly toward the lamp component while simultaneously urging the lamp component against the housing.

8. The vehicle lamp assembly according to claim 7, wherein the lamp component comprises a generally concave reflector, a lamp positioned within the reflector, and a translucent lens attached to the reflector cooperating therewith to enclose and protect the lamp.

9. The vehicle lamp assembly according to claim 7, wherein the housing includes an aperture for removing a lamp from the lamp component.

10. A vehicle, including the vehicle lamp assembly of claim 1.

11. A vehicle, including the vehicle lamp assembly of claim 7.

* * * * *